United States Patent
Lu et al.

(10) Patent No.: US 11,439,990 B2
(45) Date of Patent: Sep. 13, 2022

(54) TITANIUM CARBIDE NANOSHEET/LAYERED INDIUM SULFIDE HETEROJUNCTION AND APPLICATION THEREOF IN DEGRADING AND REMOVING WATER POLLUTANTS

(71) Applicant: SOOCHOW UNIVERSITY, Suzhou (CN)

(72) Inventors: Jianmei Lu, Suzhou (CN); Najun Li, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 281 days.

(21) Appl. No.: 16/882,017

(22) Filed: May 22, 2020

(65) Prior Publication Data
US 2020/0368731 A1 Nov. 26, 2020

(30) Foreign Application Priority Data

May 23, 2019 (CN) .......................... 201910436204.2

(51) Int. Cl.
| | | |
|---|---|---|
| B01J 27/22 | (2006.01) | |
| B01J 27/04 | (2006.01) | |
| B01J 35/00 | (2006.01) | |
| B01J 37/02 | (2006.01) | |
| C02F 1/30 | (2006.01) | |
| C02F 1/70 | (2006.01) | |
| C02F 101/22 | (2006.01) | |

(52) U.S. Cl.
CPC ............ *B01J 27/22* (2013.01); *B01J 27/04* (2013.01); *B01J 35/004* (2013.01); *B01J 35/0013* (2013.01); *B01J 37/0217* (2013.01); *B01J 37/0219* (2013.01); *C02F 1/30* (2013.01); *C02F 1/70* (2013.01); *C02F 2101/22* (2013.01); *C02F 2305/10* (2013.01)

(58) Field of Classification Search
None
See application file for complete search history.

(56) References Cited

U.S. PATENT DOCUMENTS

2006/0237059 A1* 10/2006 Kurihara .............. H01G 9/2063
136/263
2017/0088429 A1* 3/2017 Shin ...................... C01B 32/921

FOREIGN PATENT DOCUMENTS

CN 102335616 A * 2/2012
CN 104587947 A * 5/2015 .......... B01J 20/0211

OTHER PUBLICATIONS

CN-102335616-A, English translation (Year: 2012).*
CN-104587947-A, English translation (Year: 2015).*
Srt et al, sonochemically synthesized In2S3 nanoparticles using diverse indium salts, chalogenide letters, vol. 12, No. 9, pp. 477-482 (Year: 2015).*
Yu et al, Synthesis and Exfoliation of Discotic Zirconium Phosphates to Obtain Colloidal Liquid Crystals, journal of visualized experiments, 111, e53511 (Year: 2016).*
Zhang et al, Synthesis of two-dimensional Ti3C2Tx MXene using HCl þ LiF etchant: Enhanced exfoliation and delamination, journal of alloys and compounds, 818-825 (Year: 2016).*
Ran et al., Ti3C2 Mxene co-catalyst on metal sulfide photo-absorbers for enhanced visible-light photocatalytic hydrogen production, nature communications, Pub, Jan. 3, 2017, pp. 1-10 (Year: 2017).*

* cited by examiner

*Primary Examiner* — Stefanie J Cohen
(74) *Attorney, Agent, or Firm* — SZDC Law P.C.

(57) ABSTRACT

The invention provides a titanium carbide nanosheet/layered indium sulfide heterojunction and an application of the same in degrading and removing water pollutants. A simple electrostatic self-assembly method is used to uniformly absorb indium ions on the surfaces of $Ti_3C_2$ nanosheets, which effectively inhibits the stacking of the nanosheets and is beneficial to the uniform growth of $In_2S_3$ nanosheets on the surfaces of the $Ti_3C_2$. The present invent overcomes two disadvantages of too fast photogenerated carrier recombination rate of $In_2S_3$ and easy agglomeration of nano-scale $In_2S_3$, and effectively improves the separation efficiency and photocatalytic activity of photogenerated electron-hole of $In_2S_3$.

5 Claims, 4 Drawing Sheets

US 11,439,990 B2

TITANIUM CARBIDE NANOSHEET/LAYERED INDIUM SULFIDE HETEROJUNCTION AND APPLICATION THEREOF IN DEGRADING AND REMOVING WATER POLLUTANTS

This application claims priority to Chinese Patent Application No. 201910436204.2, filed on May 22, 2019, which is incorporated by reference for all purposes as if fully set forth herein.

FIELD OF THE INVENTION

The present invention relates to the technical field of inorganic nanocomposite materials, in particular to the preparation of titanium carbide nanosheet/layered indium sulfide heterojunction and its photocatalytic degradation and removal of water pollutants.

TECHNICAL BACKGROUND

Environmental and energy issues are two major challenges facing mankind in the 21st century. Among which, the utilization of solar energy and the treatment of environmental pollution are important issues facing mankind. Hexavalent chromium is a common heavy metal pollutant with high toxicity and bioaccumulation, which poses a threat to human health. Trivalent chromium is one of the trace elements needed by organisms. Through a certain redox reaction, hexavalent chromium and trivalent chromium can be converted to each other. How to use the power of the sun to solve the problem of environmental pollution has become a focus of attention. The emergence of photocatalytic technology provides an efficient "green" method to solve these two major problems. As a new technology for pollution control with mild conditions, low energy consumption and friendly environment, photocatalytic technology is based on photocatalytic materials.

With the development of nanotechnology, nano-photocatalytic materials of indium sulfide ($In_2S_3$) with different morphologies and structures have become the focus of research. However, there are still some problems in the practical application of nano-indium sulfide ($In_2S_3$). First, the photogenerated carrier recombination rate of narrow bandgap semiconductor materials is too fast and the photo-quantum yield is low. Secondly, nano-scale indium sulfide ($In_2S_3$) is easy to agglomerate, which greatly reduces its photocatalytic activity.

SUMMARY OF THE INVENTION

The object of the present invention is to provide a preparation method of titanium carbide nanosheet/layered indium sulfide heterojunction, which adopts a simple electrostatic self-assembly method to uniformly adsorb indium ions on the surface of $Ti_3C_2$ nanosheet, which not only effectively inhibits the stacking of the nanosheet, but also facilitates the uniform growth of $In_2S_3$ nanosheet on the surface of $Ti_3C_2$. In the present invention, $Ti_3C_2$ is used as a substrate, and $In_2S_3$ nanosheets are refluxed to grow to construct a titanium carbide nanosheet/layered indium sulfide heterojunction. As an important II-IV semiconductor, $In_2S_3$ has a band gap width of 2 to 2.3 eV. Indium sulfide ($In_2S_3$) semiconductor material with a narrow band gap structure can directly absorb and utilize visible light. Compared with traditional two-dimensional materials, the $Ti_3C_2$ of the present invention has excellent metalloid conductivity, and also has a large specific surface area to provide more adsorption sites and catalytically active sites to promote catalytic performance. Which is a good carrier material can effectively improve the separation efficiency and photocatalytic activity of photogenerated electron-holes.

In order to achieve the above object, the present invention adopts the following specific technical solutions:

A titanium carbide nanosheet/layered indium sulfide heterojunction, the preparation method of which comprising the following steps:

(1) using a mixture of LiF and hydrochloric acid to etch $Ti_3AlC_2$ to prepare two-dimensional transition metal carbide nanosheets;

(2) mixing the solution of the two-dimensional transition metal carbide nanosheets with the indium salt solution to form a nanosheet aggregate solution;

(3) adding thioacetamide to the nanosheet aggregate solution and reacting under reflux in an inert atmosphere to prepare titanium carbide nanosheet/layered indium sulfide heterojunction.

A method for removing pollutants in water comprising the following steps:

(1) using a mixture of LiF and hydrochloric acid to etch $Ti_3AlC_2$ to prepare two-dimensional transition metal carbide nanosheets;

(2) mixing the solution of the two-dimensional transition metal carbide nanosheets with the indium salt solution to form a nanosheet aggregate solution;

(3) adding thioacetamide to the nanosheet aggregate solution and reacting under reflux in an inert atmosphere to prepare titanium carbide nanosheet/layered indium sulfide heterojunction.

(4) putting the titanium carbide nanosheet/layered indium sulfide heterojunction into the water containing pollutants to achieve the removal of pollutants in the water.

In the above technical solution, in the step (1), the molar ratio of $Ti_3AlC_2$ and LiF is (7 to 15): 1, preferably 12:1; the concentration of hydrochloric acid is 6 to 9 mol/L, preferably 9 mol/L; the etching temperature is 20 to 35° C., preferably 25° C., and the etching time is 24 to 48 h, preferably 24h. Preferably, LiF is added to hydrochloric acid, magnetic stirring for 5 minutes to mix the solution uniformly, then $Ti_3AlC_2$ is added for etching, the time for adding $Ti_3AlC_2$ is 5 minutes to prevent boiling.

The present invention first uses LiF/HCl to etch $Ti_3AlC_2$ to prepare $Ti_3C_2$ two-dimensional transition metal carbide nanosheets. LiF/HCl etching method is milder and safer than HF etching method, and the nanosheets prepared by LiF/HCl etching are larger than that prepared by HF etching method. In the preparation process, Li+ will intercalate spontaneously so that no additional intercalation agent and/or ultrasonic delamination are required. It can be delaminated by hand shaking after etching, and the repeatability is good.

In the above technical solution, in the step (2), the mass of the two-dimensional transition metal carbide nanosheet is 1 to 3% of the mass of the indium salt; the indium salt is $InCl_3 \cdot 4H_2O$ Preferably, first adding the indium salt to deionized water and stirring, and then mixing the solution with the two-dimensional transition metal carbide nanosheets solution and stirring for 1.5 h to form a nanosheet aggregate solution.

The present invention adopts a simple electrostatic self-assembly method to uniformly adsorb indium ions on the surface of the $Ti_3C_2$ two-dimensional transition metal carbide nanosheets, which not only effectively inhibits the stacking between the nanosheets, but also facilitates the uniformly growth of $In_2S_3$ nanosheets on the surface of $Ti_3C_2$ two-dimensional transition metal carbide nanosheets.

In the above technical solution, in the step (3), the molar ratio of indium and sulfur is 2:3. That is, after adding the sulfur compound to the nanosheet aggregate solution, the molar ratio of indium element and sulfur element in the system is 2:3. The sulfur compound is thioacetamide; the inert gas is argon. The temperature of the reflux reaction is 95° C. and the time is 1.5 h. After the reflux reaction is completed, put the reaction solution into an ice-water mixture to quickly cool down. After the cooled reaction product is taken out, it is washed three times with a mixed solvent of water and ethanol, and then washed once with ethanol, and then dried in a drying oven under vacuum at 35° C. overnight to obtain a titanium carbide nanosheet/layered indium sulfide heterojunction.

In the above technical solution, in the step (4), putting the titanium carbide nanosheet/layered indium sulfide heterojunction into water containing pollutants, stirring in the dark, and then irradiating with visible light to remove pollutants in water.

The present invention also discloses the application of the titanium carbide nanosheet/layered indium sulfide heterojunction in degradation of pollutants in water. Preferably, the pollutant is hexavalent chromium.

The advantages of the present invention are as follows:

1) In the preparation method of titanium carbide nanosheet/layered indium sulphide heterojunction disclosed by the invention, LiF/HCl etching method is milder and safer than HF etching method. In the preparation process, Li+ will intercalates spontaneously so that no additional intercalation agent and/or ultrasonic delamination are required. It can be delaminated by hand shaking after etching, and the repeatability is good, and the scale is larger.

2) The invention discloses a titanium carbide nanosheet/layered indium sulfide heterojunction, which adopts a simple electrostatic self-assembly method to uniformly adsorb indium ions on the surface of $Ti_3C_2$ nanosheet. It not only effectively inhibits the stacking of nanosheet, but also facilitates the uniform growth of $In_2S_3$ nanosheet on the surface of Ti3C2.

3) As an important II-IV semiconductor, $In_2S_3$ has a band gap width of 2~2.3 eV. and can directly absorb visible light. Indium sulfide ($In_2S_3$) semiconductor material with a narrow band gap structure can directly absorb and utilize visible light.

4) In the present invention, $Ti_3C_2$ two-dimensional transition metal carbide nanosheets are used as substrates, and $In_2S_3$ nanosheets are grown by reflux to construct titanium carbide nanosheet/layered indium sulfide heterojunctions. Compared with traditional two-dimensional materials, the $Ti_3C_2$ of the present invention has excellent metalloid conductivity, and also has a large specific surface area to provide more adsorption sites and catalytically active sites to promote catalytic performance. which is a good carrier material can effectively improve the separation efficiency and photocatalytic activity of photogenerated electron-holes.

DETAILED DESCRIPTION OF THE INVENTION

In order to overcome the shortcomings in the practical application of existing nano-photocatalytic materials, the present invention uses electrostatic self-assembly, reflow method and so on to construct a titanium carbide nanosheet/layered indium sulfide heterojunction photocatalytic composite material for use in the degradation of hexavalent chromium in water, in which the new two-dimensional transition metal carbide ($Ti_3C_2$) nanosheets have excellent metalloid conductivity and large specific surface area, which is a good carrier material.

Embodiment 1

Preparation of two-dimensional $Ti_3C_2$ transition metal carbide nanosheet.

0.8 g LiF is added into 10 ml 9 mol/L HCl solution and stirred for about 5 minutes. Then 0.4 g $Ti_3AlC_2$ is added in 5 minutes to prevent boiling. Then, it is stirred for 24 h under 25° C. for etching, the reaction product is washed with water and centrifugated until pH is about 6. Deionized water is added to the product. After 15 minutes of hand shaking and centrifugation, two-dimensional transition metal carbide $Ti_3C_2$ nanosheet are obtained as black colloidal solution. The product is stored in refrigerator at 4° C. and marked as solution A.

Figure 1:
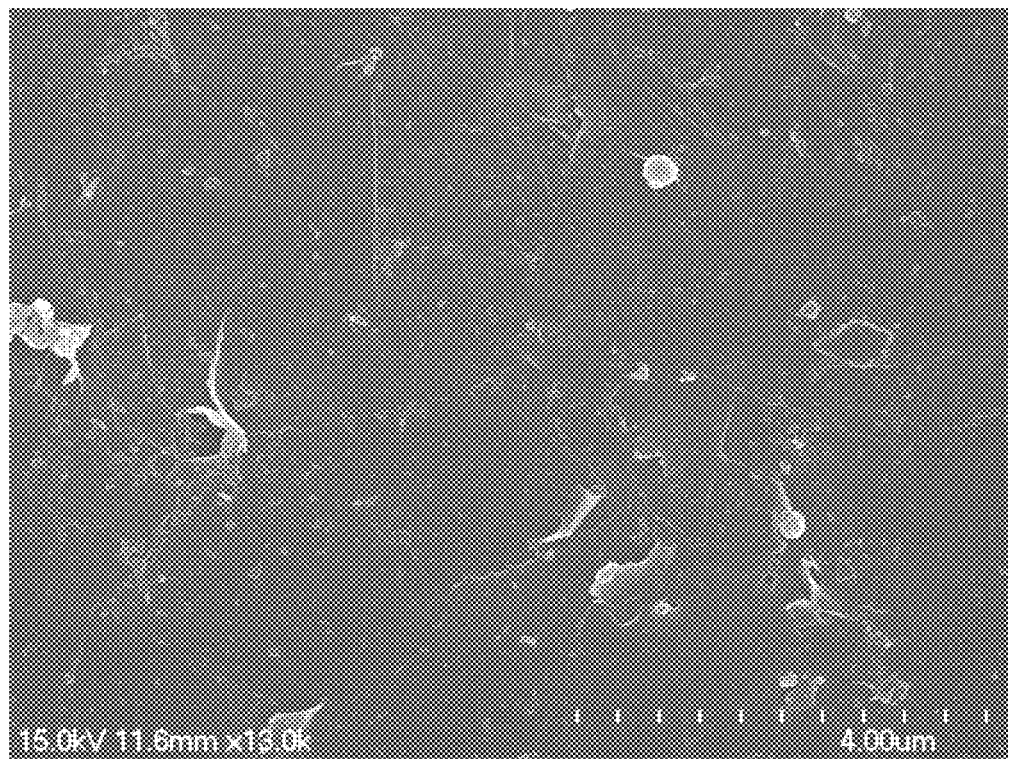
FIG. 1 is a scanning electron microscopy of titanium carbide nanosheet.

FIG. 1 is a SEM image of $Ti_3C_2$ obtained. From the figure, it can be seen that $Ti_3C_2$ MXene is a two-dimensional layered material. The thickness of the nanosheet is in the nanometer scale, the size of the plane is in the micron level, with fewer surface defects and larger specific surface area.

Embodiment 2:

Electrostatic self-assembly of indium salts with $Ti_3C_2$ nanosheet 0.8 mmol $InCl_3.4H_2O$ and 10 mL deionized water are added to a 50 mL single flask and stirred for 1 hour. It is marked as solution B. Further, 10 mL of the solution A obtained in Embodiment 1 (the mass of the two-dimensional transition metal carbide nanosheet is 2% of the mass of the indium sulfide) is added, followed by stirring for 1.5 h. Indium ions are adsorbed on the surface of the negatively charged $Ti_3C_2$ nanosheet on the surface of the surface, and the stabilized $Ti_3C_2$ colloid solution is coagulated.

Embodiment 3

Replacement of air with argon gas for reflux reaction.

1.2 mmol thioacetamide is added to the flask in Embodiment 2, the molar ratio of indium element to sulfur element in the system is 2:3. After stirring for 10 minutes, a spherical condenser tube and a three-way valve are connected, and the joint is sealed. First, the air in the flask and condenser tube is pumped out by a vacuum pump, and then argon is blown in by an air bag. The above device is added to an oil bath, connected to condensed water, and refluxed at 95° C. for 1.5 h. After the reflux is completed, it is placed in an ice water mixture to rapidly cool. The cooled reaction product is firstly washed three times with a mixed solvent of water and ethanol, and then washed once with ethanol. Finally, titanium carbide nanosheet/layered indium sulfide heterojunctions are obtained by drying in a vacuum drying chamber to constant weight.

Figure 2:
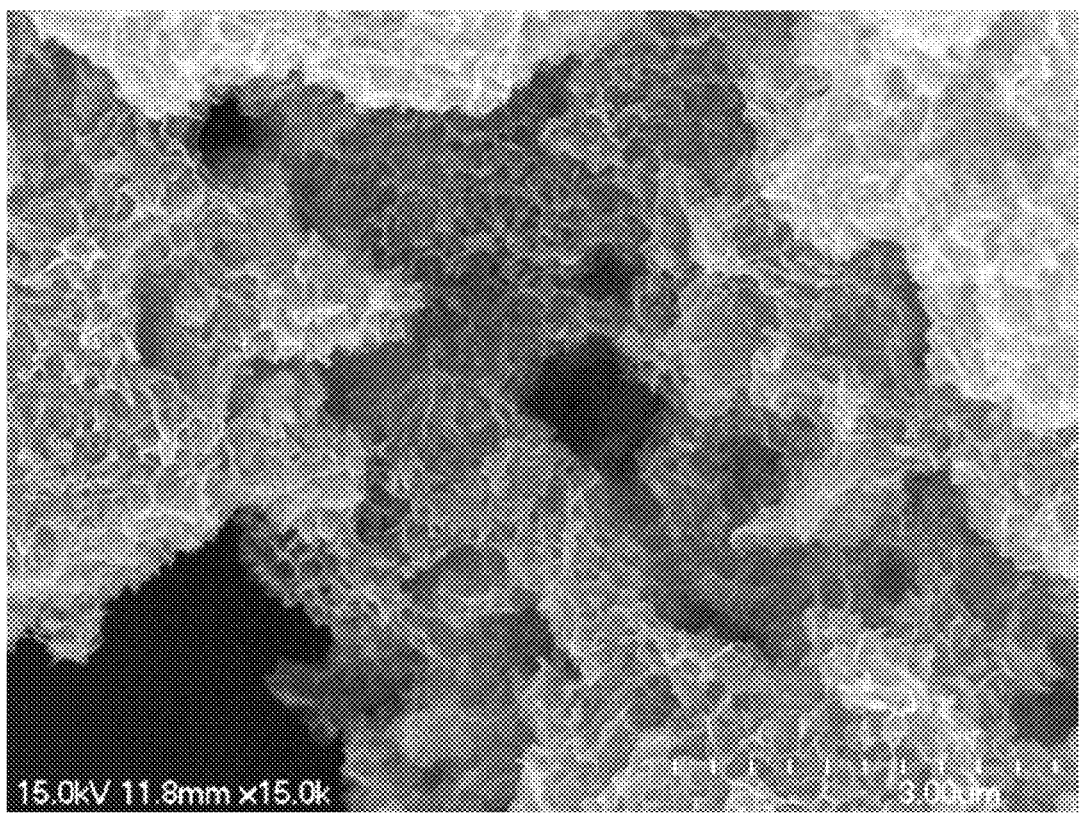
FIG. 2 is a scanning electron microscopy of titanium carbide nanosheet/layered indium sulfide heterojunction.
Figure 3:
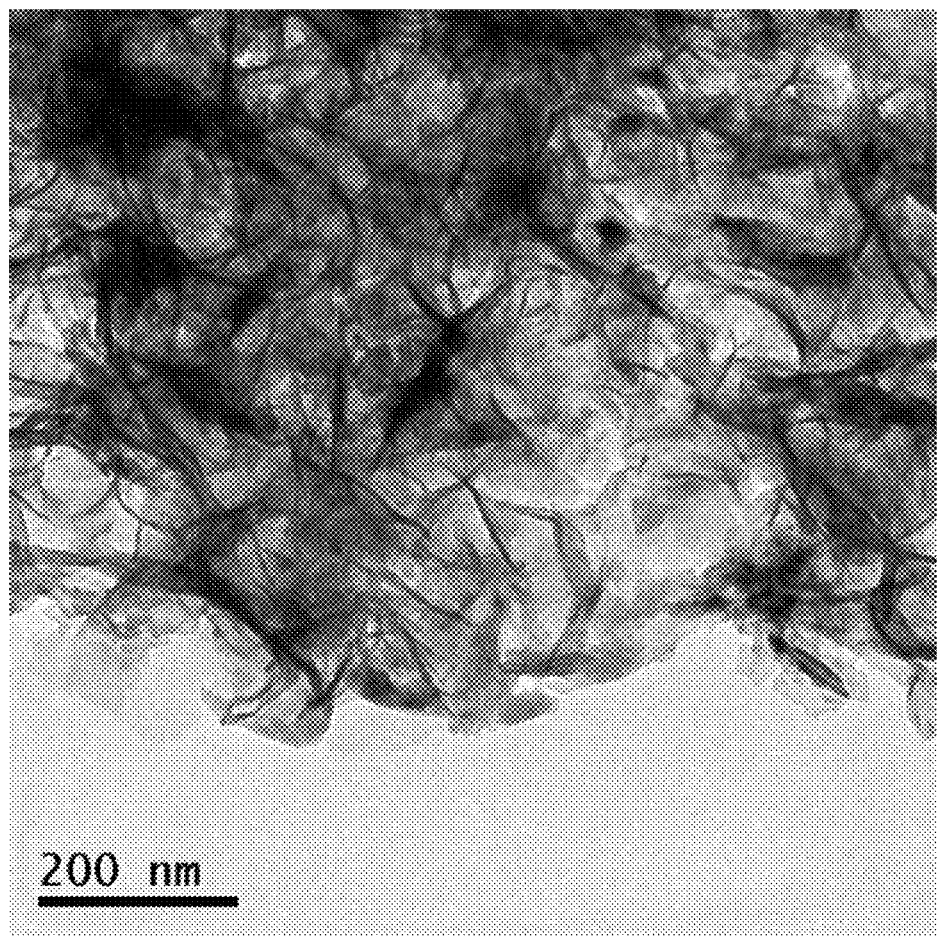
FIG. 3 is a TEM image of titanium carbide nanosheet/layered indium sulfide heterojunction.

FIG. 2 shows the scanning electron microscopy of the above titanium carbide nanosheet/layered indium sulfide heterojunction, and FIG. 3 shows the transmission electron microscopy of the above titanium carbide nanosheet/layered indium sulfide heterojunction. From the above figure, it can be seen that small layered indium sulfide uniformly grows on the surface of titanium carbide nanosheet.

Embodiment 4

The titanium carbide nanosheet/layered indium sulfide heterojunction of Embodiment 3 is placed in simulant wastewater containing hexavalent chromium, and the xenon lamp is used as the light source to illuminate for a certain period of time, and the variation curve of the concentration of hexavalent chromium in the water with the exposure time is measured to evaluate the photocatalytic degradation effect of the composite material on pollutants in water under visible light:

30 mg titanium carbide nanosheet/layered indium sulphide heterojunction is added to the 50 mL 50 ppm hexavalent chromium istewater. The adsorption equilibrium is achieved by stirring for 1 h under dark conditions. Then the xenon lamp source is turned on for visible photocatalytic degradation of hexavalent chromium in water.

The specific degradation effect of hexavalent chromium is measured by ultraviolet-visible spectrophotometer and calculated by the working curve of hexavalent chromium concentration-absorbance. That is to say, the absorbance is determined by adding chromogenic agent, and the degradation efficiency is calculated by absorbance. The initial concentration of hexavalent chromium is recorded at 100%. Then, with the photocatalysis proceeding, the concentration gradually decreases, and the specific degradation curve of hexavalent chromium is obtained.

Figure 4:
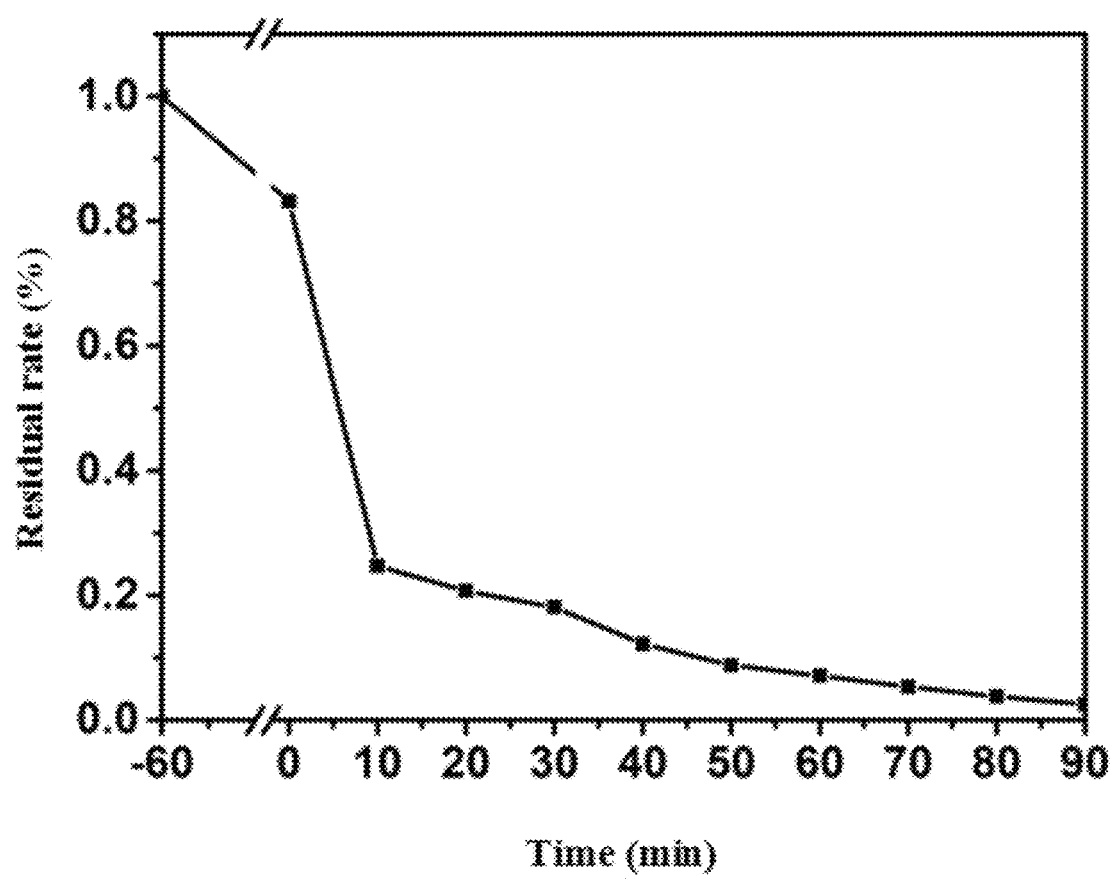
FIG. 4 is a degradation curve of hexavalent chromium in water by titanium carbide nanosheet/layered indium sulfide heterojunction.

FIG. 4 shows the degradation curve of hexavalent chromium in water by titanium carbide nanosheet/layered indium sulfide heterojunction. The first 60 minutes are the equilibrium adsorption time. It can be seen that the titanium carbide nanosheet/layered indium sulfide heterojunction of the invention has high degradation efficiency to hexavalent chromium in water, and is removed by 93% in 60 min, and the basic degradation is completed in 90 min, leaving about 3%. The pure $Ti_3C_2$ nanosheet only adsorbs and has no degradation performance, leaving 76% after 90 min. If the LiF/HCl of Embodiment 1 is replaced by HF and the rest remains unchanged, the final titanium carbide nanosheet/layered indium sulfide heterojunction is used for the degradation of hexavalent chromium, leaving 29% after 90 min; if $InCl_{3.4}H_2$) reacts directly with thioacetamide, the prepared material can be used for the degradation of hexavalent chromium, leaving 59% after 90 min; while in the Embodiment 3, thioacetamide is 2.4 mmol without titanium carbide and the rest remains unchanged, the obtained material is used for the degradation of hexavalent chromium, leaving 32% after 90 min.

The calculating method of the degradation rate of hexavalent chromium is as follows:

$$D\% = \frac{A_0 - A}{A_0} \times 100\%$$

$A_0$ and A are the initial phenol absorbance and test absorbance in the experiment (tested every 10 minutes).

The invention uses $Ti_3C_2$ as a substrate to reflow and grow $In_2S_3$ nanosheet to construct a titanium carbide nanosheet/layered indium sulfide heterojunction. As an important II-IV semiconductor, $In_2S_3$ has a band gap width of 2~2.3 eV and can directly absorb visible light. Compared with the traditional two-dimensional material, the $Ti_3C_2$ of the invention has excellent metalloid conductivity, and has a large specific surface area to provide more adsorption sites and catalytic active sites to promote catalytic performance, which is a good carrier material can effectively improve the separation efficiency and photocatalytic activity of photogenerated electron-holes.

What is claimed is:

1. A method of preparing a titanium carbide nanosheet/layered indium sulfide heterojunction, consisting of the following steps:
   (1) using a mixture of LiF and hydrochloric acid to etch $Ti_3AlC_2$ to prepare two-dimensional transition metal carbide nanosheets, washing the two-dimensional transition metal carbide nanosheets with water and centrifugating, and adding water to form a solution of the two-dimensional transition metal carbide nanosheets;
   (2) mixing the solution of the two-dimensional transition metal carbide nanosheets with an indium salt solution to form a nanosheet aggregate solution;
   (3) adding thioacetamide to the nanosheet aggregate solution and reacting under reflux in an inert atmosphere to prepare the titanium carbide nanosheet/layered indium sulfide heterojunction; and
   (4) degrading pollutants in water by applying the titanium carbide nanosheet/layered indium sulfide heterojunction,
   wherein in the step (1), a molar ratio of $Ti_3AlC_2$ and LiF is (7 to 15): 1; a concentration of hydrochloric acid is 6 to 9 mol/L; an etching temperature is 20 to 35° C., and an etching time is 24 to 48 h;
   wherein in the step (2), a mass of the two-dimensional transition metal carbide nanosheet is 1 to 3% of a mass of the indium salt; the indium salt is $InCl_3 \cdot 4H_2O$;
   wherein the step (2) consists of first adding the indium salt to deionized water and stirring, and then mixing the solution with the two-dimensional transition metal carbide nanosheets solution and stirring for 1.5 h to form a nanosheet aggregate solution; and
   wherein in the step (3), the temperature of the reflux reaction is 95° C. and the time is 1.5 h.

2. The method according to claim 1, wherein the molar ratio of $Ti_3AlC_2$ and LiF is 12:1; the concentration of hydrochloric acid is 9 mol/L; the etching temperature is 25° C., and the etching time is 24 h.

3. The method according to claim 1, wherein in the step (3), the molar ratio of indium and sulfur is 2:3.

4. The method according to claim 1, wherein in the step (3), the sulfur compound is thioacetamide; the inert gas is argon.

5. The method according to claim 1, wherein the pollutants include hexavalent chromium.

* * * * *